United States Patent [19]

Otomo

[11] Patent Number: 5,719,699
[45] Date of Patent: Feb. 17, 1998

[54] ELECTRIC REVOLVER APPARATUS OF MICROSCOPE

[75] Inventor: Masahiko Otomo, Kanagawa-ken, Japan

[73] Assignee: Nikon Corporation, Tokyo, Japan

[21] Appl. No.: 441,053

[22] Filed: May 15, 1995

[30] Foreign Application Priority Data

May 17, 1994 [JP] Japan ................... 6-102957

[51] Int. Cl.⁶ .................. G02B 21/00; G02B 21/26; G02B 7/02
[52] U.S. Cl. .................. 359/368; 359/391; 359/392; 359/393; 359/384; 359/821; 359/827; 250/201.3
[58] Field of Search ............... 359/368, 391, 359/392, 393, 384, 821, 822, 827; 250/201.3

[56] References Cited

U.S. PATENT DOCUMENTS

| | | | |
|---|---|---|---|
| 3,634,689 | 1/1972 | Ejiri et al. | 250/201 |
| 4,001,885 | 1/1977 | Ikushima | 360/35 |
| 4,486,078 | 12/1984 | Hashimoto et al. | 359/381 |
| 4,643,540 | 2/1987 | Kawasaki et al. | 364/525 |
| 4,653,878 | 3/1987 | Nakasato et al. | 359/381 |
| 4,946,265 | 8/1990 | Shimizu et al. | 359/381 |
| 5,517,353 | 5/1996 | Ikoh et al. | 359/388 |

FOREIGN PATENT DOCUMENTS

| | | | |
|---|---|---|---|
| 388812 | 9/1990 | European Pat. Off. | 359/384 |
| 403296707 | 12/1991 | Japan | 359/368 |

*Primary Examiner*—Thong Nguyen
*Assistant Examiner*—Mohammad Y. Sikder
*Attorney, Agent, or Firm*—Shapiro and Shapiro

[57] ABSTRACT

An electric revolver apparatus of a microscope comprises a revolver holding a plurality of objective lenses, a drive device for driving and braking the revolver based on a command signal from the outside of the electric revolver apparatus, a detection device for detecting a predetermined amount of rotation of the revolver and outputting a detection signal to brake the drive device, and a delay circuit for delaying the detection signal for a predetermined period of time and outputting it to the outside to delay the brake starting time of the drive device based on the command signal from the outside.

4 Claims, 8 Drawing Sheets

ELECTRIC REVOLVER APPARATUS OF MICROSCOPE

BACKGROUND OF THE INVENTION

1. Field of the Invention

The present invention relates to an electric revolver apparatus of a microscope.

2. Related Background Art

Usually, an electric revolver apparatus of a microscope replaces an objective lens by rotating a revolver provided with a plurality of objective lenses by means of a motor, etc. when receiving a drive command from an operating section. The objective lenses are provided in a circumferential direction of the revolver at regular intervals.

Figure 11:
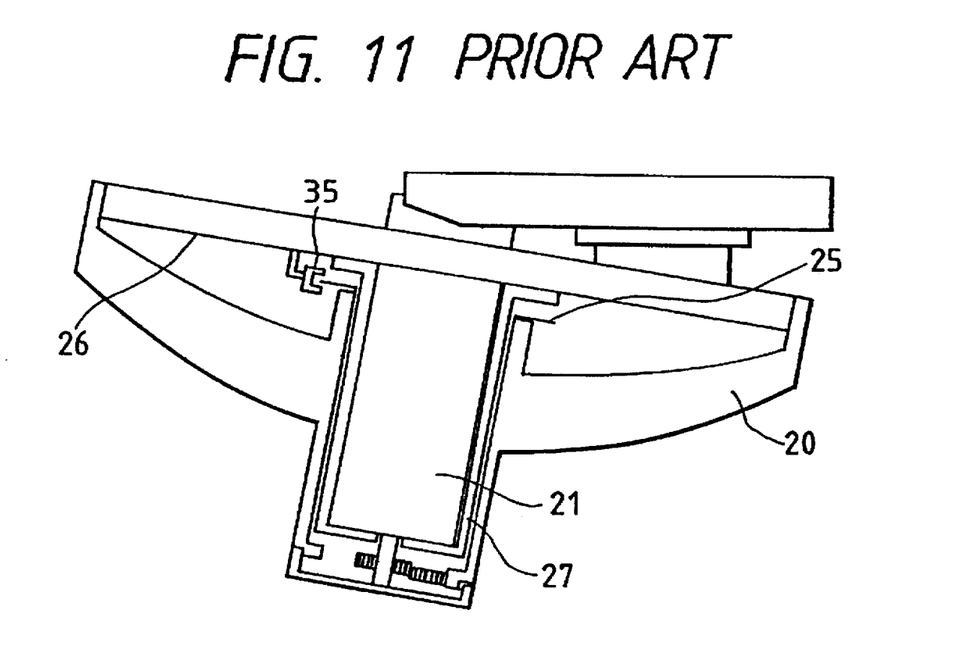
FIG. 11 is a diagram showing an example of a conventional electric revolver apparatus.

FIG. 11 shows a conventional electric revolver apparatus.

Figure 12:
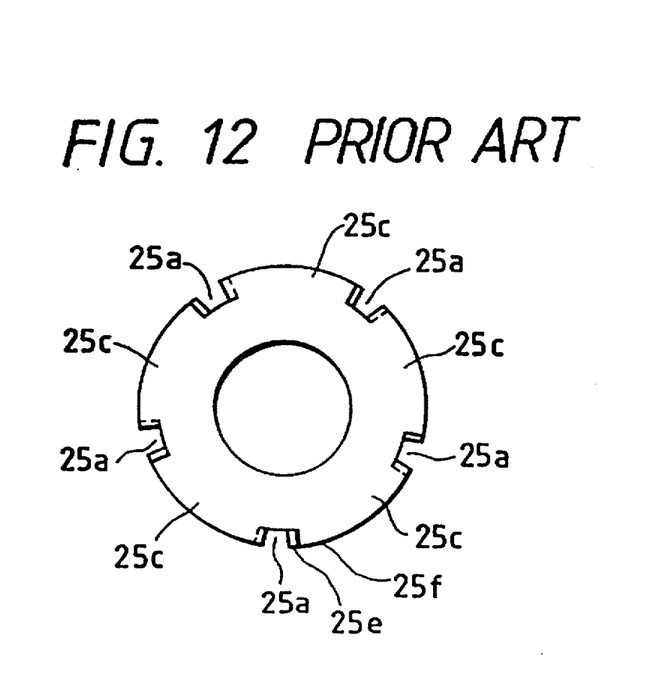
FIG. 12 is a plan view showing an example of a douser provided in the conventional electric revolver apparatus.

In FIG. 11, the electric revolver apparatus is equipped with a revolver 20 capable of having a plurality of an objective lenses mounted thereto, a motor 21 for rotating the revolver 20, and a photointerrupter 35 and a douser 25 for detecting a predetermined amount of rotation of the revolver 20. The motor 21 is held by a holding case 27. The holding case 27 is fixed to a fixing member 26. The photointerrupter 35 is secured to the fixing member 26. As shown in FIG. 12, the douser 25 consists of two dousers 25e, 25f each having a plurality of cutouts 25a in the peripheral portion at regular intervals. The douser 25 is utilized with the two dousers 25e, 25f overlapped. The dousers 25e, 25f are provided inside the revolver 20.

Light emitting and light receiving sections of the photointerrupter 35 are disposed so as to interpose the douser 25 between them. When the photointerrupter 35 detects the cutout 25a, it is in a transmittance condition. On the other hand, when the photointerrupter 35 detects a peripheral portion 25c, it is in a shade condition.

When the photointerrupter 35 detects the cutout 25a, the motor 21 starts braking the revolver 20. The resultantly decelerated revolver 20 is stopped mechanically by an unshown positioning member (a clock stop mechanism consisting of a V-groove and a ball). When this braking is strong, the revolver 20 stops in front of a stopped position determined by the positioning member. On the contrary, when the braking is weak, the revolver 20 cannot stop at the stopped position.

In such an electric revolver apparatus, in order to stop the revolver 20 at the predetermined stopped position accurately, it is necessary to adjust the stopped position of the revolver 20 by changing timing of the start of the aforementioned braking.

The timing of the start of the braking is changed by adjusting the width of the cutouts 25a. The width of the cutouts is adjusted by moving the two dousers 25e, 25f relatively in the circumferential direction.

Usually, the adjustment of the width of the cutouts is performed by a specialized adjusting jig prior to assembling the electric revolver apparatus. However, the width of the cutouts is varied finely because of variation in accuracy of the positioning member and variation in rotational force of the motor. Therefore, when the revolver is not stopped at the predetermined stopped position, the width of the cutouts of the douser cannot be adjusted without disassembling the assembled electric revolver apparatus. Also, since this adjustment is repeated until the revolver is stopped at the predetermined stopped position, it takes a lot of time and becomes an operation requiring skill.

SUMMARY OF THE INVENTION

It is an object of the present invention to provide an electric revolver apparatus of a microscope in which the stopped position of a revolver can be adjusted not mechanically but electrically.

It is another object of the present invention to provide an electric revolver apparatus of a microscope in which there is no need to adjust the stopped position of a revolver at the time of replacing the electric revolver apparatus, enabling realization of reducing labor required for the adjusting operation.

Figure 2:
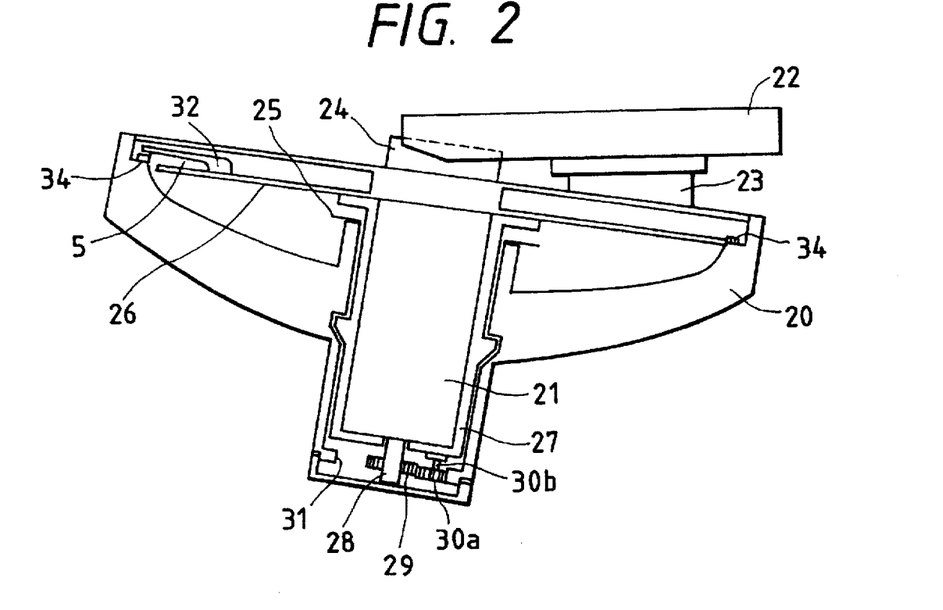
FIG. 2 is a schematic diagram showing the structure of an electric revolver apparatus according to the preferred embodiment of the present invention.
Figure 6:
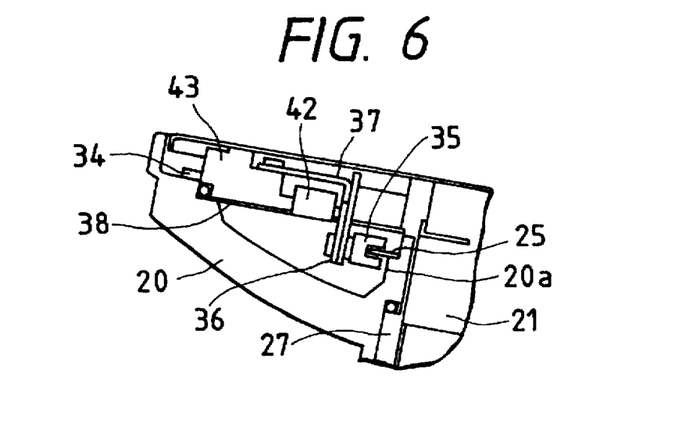
FIG. 6 is a partial sectional view of the electric revolver apparatus of FIG. 5.

An electric revolver apparatus of a microscope of the present invention, e.g., as shown in FIGS. 2 and 6, comprises:

a revolver (20) holding a plurality of objective lenses;

a drive device (21) for driving and braking the revolver (20) based on a command signal from the outside of the electric revolver apparatus;

a detection device (25, 35) for detecting a predetermined amount of rotation of the revolver (20) and outputting a detection signal to brake the drive device (21); and a delay circuit (36, 42) for delaying the detection signal for a predetermined period of time and outputting it to the outside to delay the brake starting time of the drive device (21) based on said command signal from the outside.

Figure 1:
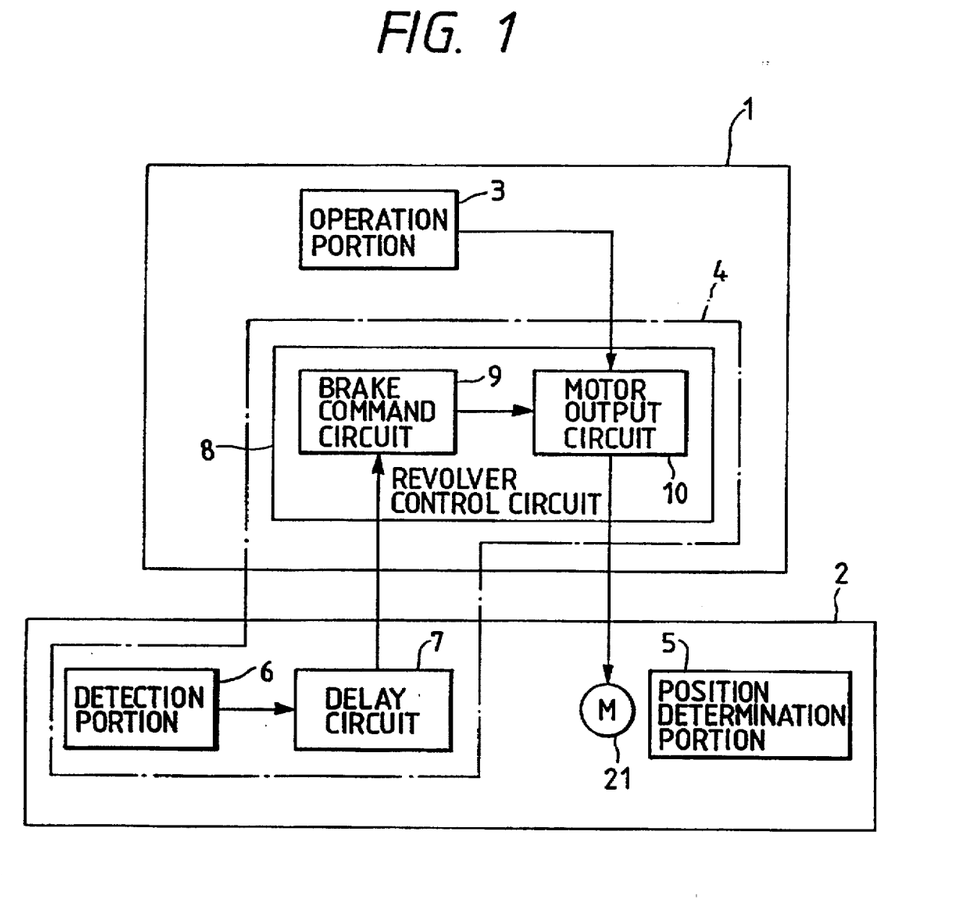
FIG. 1 is a schematic block diagram showing the structure of a microscope according to a preferred embodiment of the present invention.

Also, a microscope of the present invention, e.g., as shown in FIGS. 1, 2 and 6, comprises:

an electric revolver apparatus (20, 26, 27) being removably attached to a microscope body and having a revolver (21) holding a plurality of objective lenses;

a drive device (21) for driving the electric revolver apparatus;

a control circuit (8) provided in the microscope body for controlling driving and braking of the drive device (21);

a detection device (25, 35) provided in the electric revolver apparatus for detecting a predetermined amount of rotation of the revolver (20) and generating a detection signal to brake the drive device (21); and a delay circuit (36, 42) provided in the electric revolver apparatus for delaying the detection signal from the detection device (25, 35) for a predetermined period of time and outputting it to the control circuit.

Also, an electric revolver apparatus of a microscope, e.g., as shown in FIGS. 1, 2 and 6, comprises:

a revolver (20) holding a plurality of objective lenses;

a holding member (26, 27) holding the revolver (20) rotatably;

a drive device (21) provided in the holding member for driving the revolver;

a control circuit (8), upon receiving a rotation command or a brake command of the drive device, for controlling the drive device in accordance with the rotation command or the brake command;

a detection device (25, 35) for detecting a predetermined amount of rotation of the revolver and outputting a detection signal to brake the drive device; and a delay circuit (36, 42) provided in the holding member for outputting the brake command to the control circuit after the delay circuit has received the detection signal and a predetermined period of time has elapsed.

According to the present invention, the delay circuit (36, 42) delays the time of outputting the detection signal for a predetermined period of time after the revolver has rotated through the predetermined amount. By adjusting this delay time, it is possible to adjust the start time of the stopping operation of the drive device (21) operated based on the command from the control circuit (8), whereby the revolver (20) can be stopped at the predetermined position.

DETAILED DESCRIPTION OF THE PREFERRED EMBODIMENT

FIG. 1 is a schematic block diagram showing the structure of a microscope of the present invention. An electric revolver apparatus 2 of the microscope is removably mounted to a microscope body 1.

The electric revolver apparatus 2 has a motor 21, a position determination portion 5, a rotation detection portion 6 and a delay circuit 7. The motor 21 rotates and brakes a revolver 20 (see FIG. 2). The position determination portion 5 is for mechanically stopping the revolver 20 decelerated due to the braking by means of the motor 21 at a predetermined position. The detection portion 6 detects that the amount of revolution of the revolver 20 has reached a predetermined amount, and it supplies a detection signal to the delay circuit 7. After the delay circuit 7 receives the detection signal from the detection portion 6 and a predetermined period of time (delay time) has elapsed, it outputs a signal.

The microscope body 1 has an operation portion 3 for issuing a rotation command for the revolver 20, and a revolver control circuit 8 for controlling driving and braking of the revolver 20. The revolver control circuit 8 is provided with a brake command circuit 9 and a motor output circuit 10. Upon receiving the signal from the delay circuit, the brake command circuit 9 issues a brake command. The motor output circuit 10 rotates the motor 21 in accordance with the rotation command from the operation portion 3, and brakes the motor 21 in accordance with the brake command from the brake command circuit 9.

A control device 4 is constituted of the detection portion 6, the delay circuit 7, the brake command circuit 9 and the motor output circuit 10.

Figure 3:
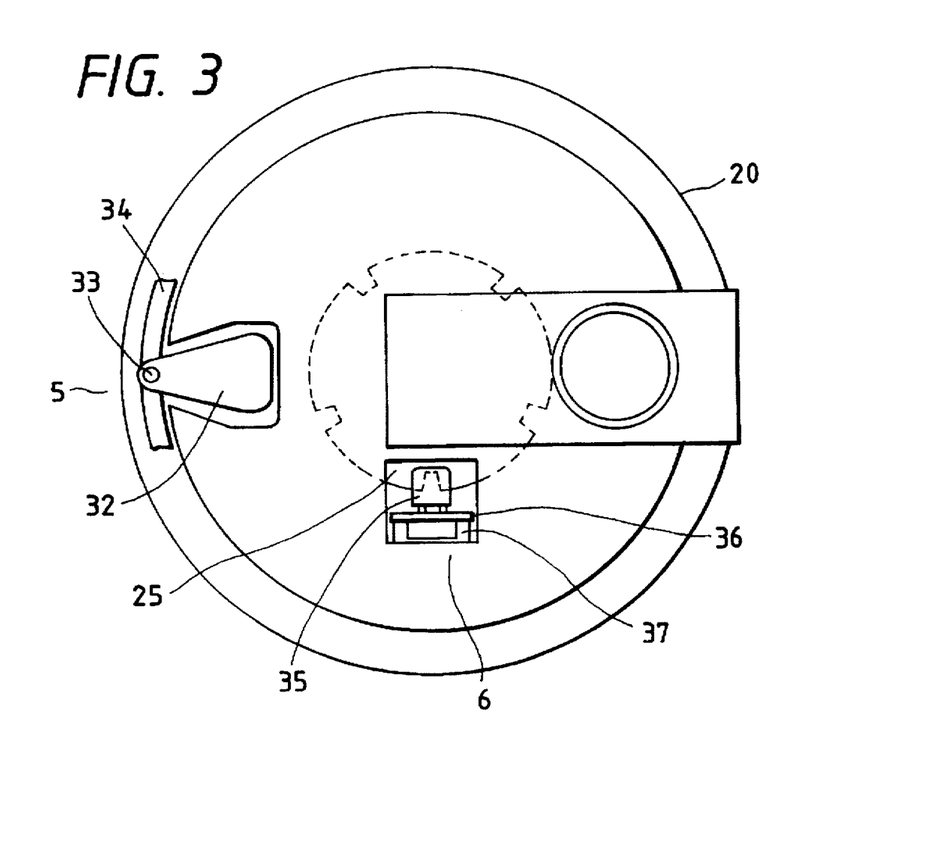
FIG. 3 is a schematic plan view showing the structure of the electric revolver device of FIG. 2.

FIGS. 2 and 3 schematically show the electric revolver apparatus.

The electric revolver apparatus is provided with the revolver 20 having a plurality of objective lenses (not shown); the motor 21 for rotating and braking the revolver 20; the position determination portion 5 for stopping the revolver 20 at the predetermined position; and the rotation detection portion 6 for detecting that the amount of revolution of the revolver 20 has reached the predetermined amount.

The revolver 20 is provided in the intermediate portion with the motor 21. The motor 21 is held by a holding case 27. The holding case 27 is fixed to a fixing member 26. The fixing member 26 is removably attached to a mounting member 24 secured to the microscope body. The mounting member 24 is secured to a support base 22. The support base 22 is provided with a tube 23. In the electric revolver apparatus of this embodiment, the motor is disposed on the rotation axis of the revolver, but may be disposed on a peripheral portion of the revolver.

The revolver 20 is rotatably held by the holding case 27 and rotates with the holding case 27 as a rotation shaft when the motor 21 is driven.

A rotation shaft 28 of the motor 21 is provided with a gear 29. A gear 30a fixed to the holding case 27 is meshed with the gear 29 and a gear 31 formed on the revolver 20 to transmit rotational force of the motor 21 to the revolver 20.

Figure 4A:
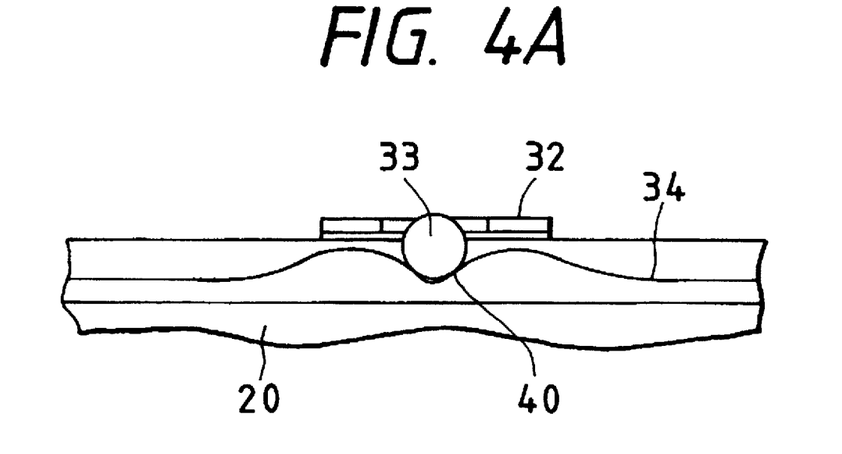
FIGS. 4A and 4B are diagrams showing an example of a position determination portion.
Figure 4B:
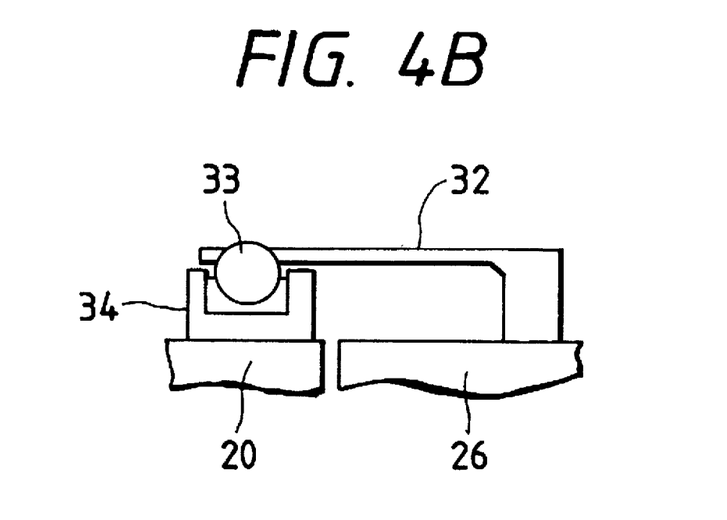

FIGS. 4A and 4B show the structure of the position determination portion 5. An arm plate 32 is secured to the fixing member 26. A steel ball 33 is mounted on the tip portion of the arm plate 32. Also, on the inner peripheral portion of the revolver 20 is mounted a rail 34 on which the steel ball 33 is slid. A plurality of V-grooves 40 are formed in the rail 34 so as to be arranged at regular intervals. When the optical axis of the tube 23 of FIG. 2 coincides with that of the objective lens mounted in the revolver 20, the steel ball 33 is fitted in the V-groove. The V-grooves 40 are shaped such that the steel ball 33 can easily escape therefrom when the revolver 20 is rotated.

Figure 5:
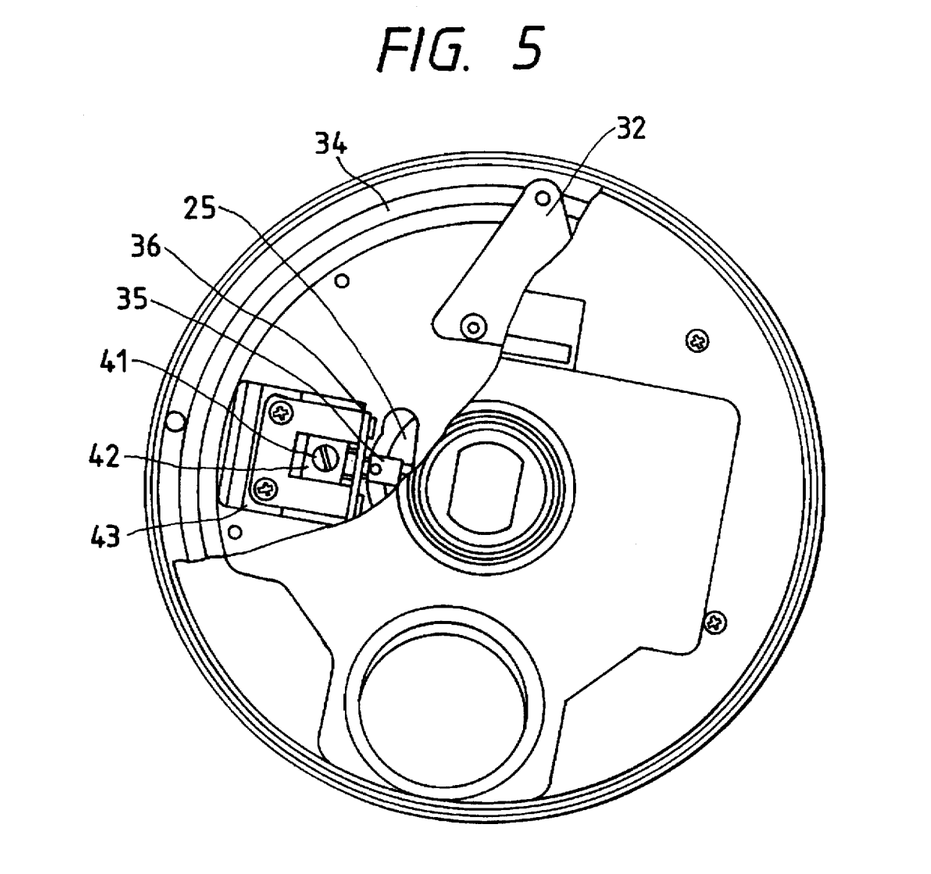
FIG. 5 is a diagram showing the structure of the electric revolver apparatus according to the preferred embodiment of the present invention.

FIGS. 5 and 6 show the structure of the above-mentioned detection portion 6.

The detection portion 6 is constituted of a photointerrupter 35 and a douser 25. The photointerrupter 35 is fixed to a mounting member 37 together with a circuit board 36. The mounting member 37 is mounted to a fixing member 43. The fixing member 43 is fixed to a fixing plate 38. The fixing plate 38 is secured to the holding case 27. A variable resistor 42 is fixed to the fixing plate 38. On the upper portion of the variable resistor 42 is provided an adjusting screw 41 for setting the resistance value of the variable resistor 42. A detection signal from the photointerrupter 35 is sent to the microscope body via a delay circuit (corresponding to the delay circuit 7 in FIG. 1) consisting of the circuit board 36 and the variable resistor 42. The resistance value of the variable resistor 42 can be changed by the adjusting screw 41 to set the delay time of the output signal.

Figure 7:
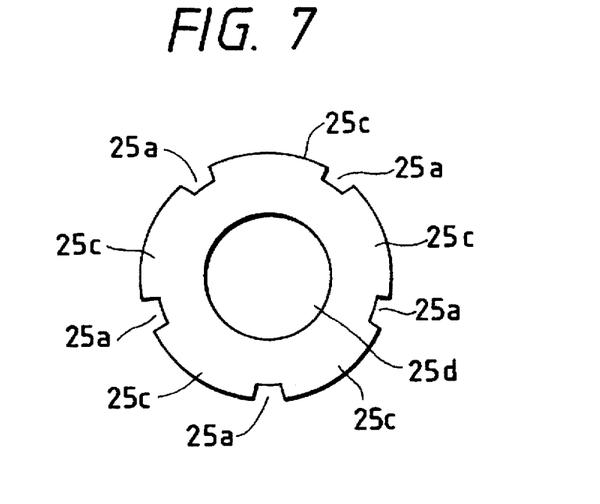
FIG. 7 is a plan view showing an example of a douser according to the preferred embodiment of the present invention.

The peripheral portion of the douser 25 provided on a flange portion 20a of the revolver 20 is positioned between light emitting and light receiving sections of the photointerrupter 35. As shown in FIG. 7, the peripheral portion of the douser 25 is formed with a plurality of cutouts 25a at regular intervals. The cutouts 25a serve as light transmitting portions, while peripheral portions 25c serve as light shading portions. Also, the center portion of the douser 25 is formed with an opening 25d for fitting the douser 25 on the flange portion 20a.

Figure 8:
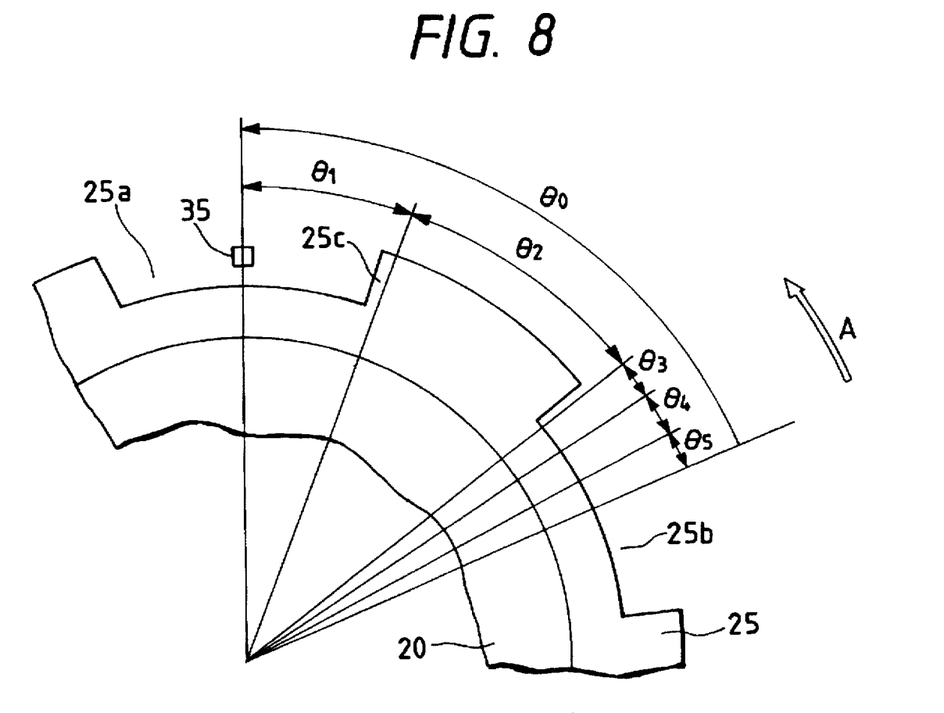
FIG. 8 is a diagram for explaining the operation of the douser according to the preferred embodiment of the present invention.

Next, description is made of the replacing operation of the objective lens by means of the above-described electric revolver apparatus with reference to FIGS. 1 and 8.

When the objective lens is disposed in the light path of the microscope and the revolver 20 and the douser 25 are stopped, the steel ball 33 is fitted in the V-groove 40. At this time, the photointerrupter 35 is located in the center of the cutout 25a and is in the transmittance condition. Also, in a position spaced at the angle $\theta_0$ away from the center of the cutout 25a, is located the center of the adjacent cutout (cutout 25b).

When rotating the revolver 20 in the A direction indicated by the arrow, the douser 25 rotates in the same direction. As soon as the rotation angle of the douser 25 reaches $\theta_1$, the peripheral portion 25c is located between the light emitting and light receiving portions of the photointerrupter 35, so that the photointerrupter 35 is in the shade condition. Further, when the douser 25 is rotated through $\theta_2$, the photointerrupter 35 is in the transmittance condition again. At this time, the photointerrupter 35 outputs a detection signal to the delay circuit 7 (the circuit board 36 and the variable resistor 42 in FIG. 6). After the delay circuit 7 receives the detection signal and the predetermined time (delay time) has elapsed, it outputs a detection signal to the revolver control circuit 8. Upon receiving the detection signal, the revolver control circuit 8 brakes the motor 21 for a predetermined period of time. The douser 25 rotates through $\theta_3$ during the delay time, and rotates through $\theta_4$ during the braking of the motor 21 by means of the revolver control circuit 8. After the revolver control circuit 8 has terminated the braking of the motor 21, the decelerated revolver 20 and douser 25 rotate through $\theta_5$ due to inertia and stop when the steel ball 33 fits in the V-groove 40. If the delay time is long, the angle $\theta_3$ becomes large, and vice versa. Since the brake time is determined beforehand, the angle $\theta_4$ is constant.

When the steel ball 33 stops in front of the V-groove 40, the delay time must be lengthened. On the other hand, when it climbs over the V-groove 40, the delay time must be shortened. The width of the cutouts 25a of the douser 25 is determined based on permissible ranges of respective rotational forces and braking forces of mass-produced electric revolver apparatuses. Rotational forces and braking forces of mass-produced electric revolver apparatuses are minutely different. For example, in the case of an electric revolver apparatus having large rotational force, if the width of cutouts is too narrow, a steel ball climbs over a V-groove even though the delay time is zero. Also, in the case of an electric revolver apparatus having small rotational force, if the width of cutouts is too large, a steel ball stops in front of a V-groove even though the delay time is as long as possible. Therefore, in consideration of these factors, the width of the cutouts 25a is determined.

Figure 9:
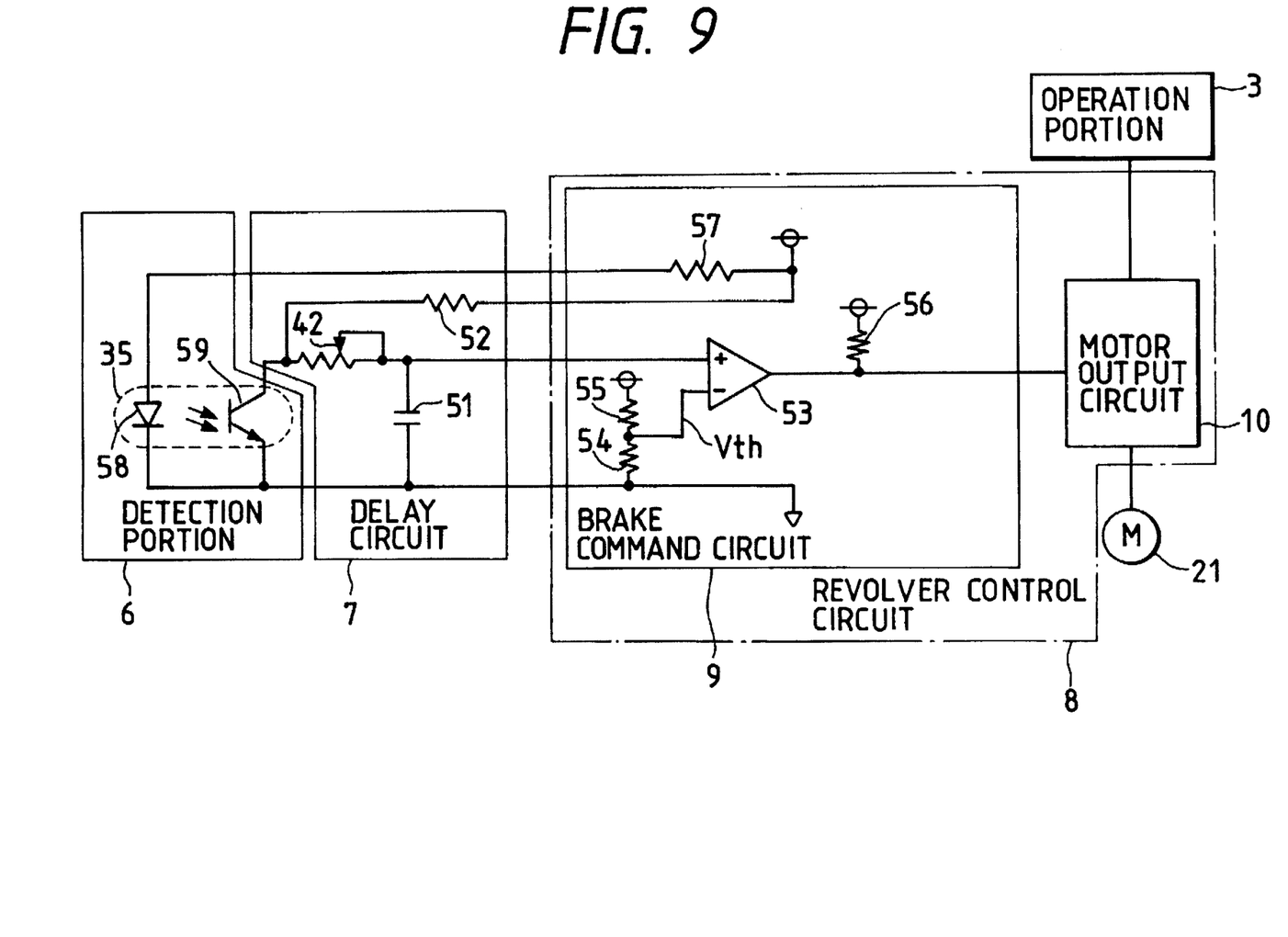
FIG. 9 is a circuit diagram according to the preferred embodiment of the present invention.
Figure 10:
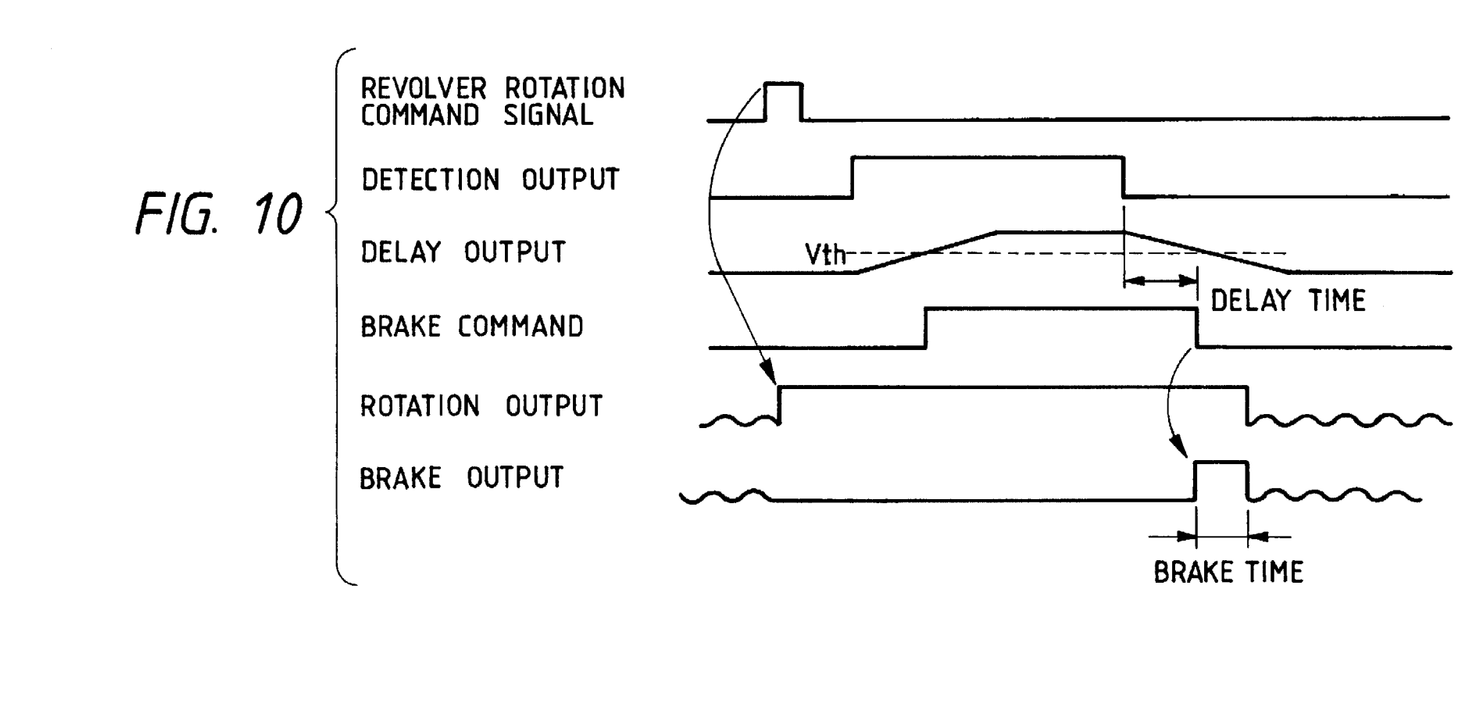
FIG. 10 is a timing chart of the circuit diagram according to the preferred embodiment of the present invention.

Next, the operation of the electric revolver apparatus of this embodiment will be described with reference to FIG. 9 showing the structure of the circuit thereof and FIG. 10 showing the timing chart of the circuit.

The circuit diagram of FIG. 9 corresponds to the block diagram of FIG. 1 and elements having identical functions to those in FIG. 1 are designated by like reference numerals.

The photointerrupter 35 of the detection portion 6 is equipped with a light emitting diode 58 and a phototransistor 59. Constant current flows in the light emitting diode 58 to cause it to emit light. The phototransistor 59 receives the light and outputs a collector current. The delay circuit 7 has the variable resistor 42 for varying the delay time, a pull-up resistor 52 and a capacitor 51. The brake command circuit 9 has a resistor 57 connected to the anode of the phototransistor 59, resistors 54, 55 for threshold voltage, a comparator 53 and a pull-up resistor 56.

In FIG. 10, when the revolver stops at the predetermined stopped position, the detection signal from the detection portion 6 is on a low level (hereinafter described simply as "L"). At this time, the objective lens prior to the switching is disposed in the light path of the microscope. When a revolver rotation command signal is output from the operation portion 3, the motor output circuit 10 in the revolver control circuit 8 sets a rotation output for the motor 21 to a high level (hereinafter described simply as "H"). When the rotation output becomes H, the motor 21 is driven to cause the revolver and the douser to rotate.

When the peripheral portion of the douser is located between the light emitting portion 58 and the light receiving portion 59 of the photointerrupter 35, a detection output from the photointerrupter 35 is switched from L to H. Then, the capacitor 51 is charged via the pull-up resistor 52 and the variable resistor 42. A delay output from the delay circuit 7 becomes H with a time constant determined by the capacitor 51, the pull-up resistor 52 and the variable resistor 42. The output side of the delay circuit 7 is connected to a non-inversion input terminal of the comparator 53. Voltage divided by the resistors 54, 55 for threshold voltage is applied to an inversion input terminal of the comparator 53. When the electric potential of the delay output exceeds a voltage value Vth of the inversion input terminal of the comparator 53, a brake command output from the comparator 53 to the motor output circuit 10 is switched from L to H.

As the revolver is rotated further, the photointerrupter 35 detects the cutout of the douser. At this time, the detection input is switched from H to L. Consequently, the capacitor 51 is discharged with the above-mentioned time constant. When the electric potential of the delay output is lowered less than the voltage value Vth of the inversion input terminal of the comparator 53, the brake command of the output of the comparator 53 is switched from H to L. At this time, the motor output circuit 10 switches the brake output for the motor 21 from L to H. Then, the motor 21 starts braking the revolver. After the brake output is carried out for a predetermined period of time, the revolver rotates due to inertia and is finally stopped at the predetermined position. At this time, the switched objective lens is disposed in the light path of the microscope.

The time from when the detection output is switched from H to L to when the brake command is switched from H to L is the delay time. As mentioned above, it is possible to easily change the delay time by adjusting the resistance value of the variable resistor 42. Also, since the variable resistor 42 is provided not in the microscope body but in the electric revolver apparatus, if a plurality of electric revolver apparatuses are utilized, the stopped position of the revolver can be adjusted for each electric revolver apparatus, so compatibility between the microscope body and the electric revolver apparatuses is excellent.

What is claimed is:

1. A microscope comprising:

an objective revolver being removably attached to a microscope body;

a drive device for driving said revolver;

a position determination device for stopping said revolver at a predetermined stop position and holding said revolver at said predetermined stop position;

a detection device for detecting a predetermined rotational position of said revolver and outputting a detection signal;

a revolver control device for stopping driving of said revolver by said drive device after receiving said detection signal, and allowing said revolver to rotate by inertia;

a delay circuit, connected to said detection device and said revolver control device, for delaying receipt of said detection signal by said revolver control device for a predetermined period of time;

an adjusting device to adjust said predetermined period of time to ensure that said revolver is stopped at said predetermined stop position; and a holding member having said drive device, said delay circuit, and said adjusting device fixed thereto, said holding member rotatably holding said revolver and being removably attached to said microscope body.

2. A microscope according to claim 1, wherein said position determination device is a click stop mechanism.

3. A microscope according to claim 1, wherein said delay circuit has a capacitor, a pull-up resistor and a variable resistor, and said detection signal is output to said revolver control device in accordance with a time constant determined by said capacitor, said pull-up resistor and said variable resistor.

4. A microscope according to claim 1, wherein said revolver control device brakes said drive device for a predetermined period of time after said detection signal is received.

* * * * *